US012372925B2

(12) United States Patent
Reginelli et al.

(10) Patent No.: US 12,372,925 B2
(45) Date of Patent: Jul. 29, 2025

(54) PORTABLE DEVICE COMPRISING DECORATIVE ELEMENTS DRIVEN BY INVISIBLE DRIVING MEANS, IN A LIQUID

(71) Applicant: Preciflex SA, Neuchâtel (CH)

(72) Inventors: Sandro Reginelli, La Neuveville (CH); Toralf Bork, Enges (CH); Jean Gubelmann, Yverdon-les-Bains (CH); Johann Rohner, Pomy (CH); Alain Jaccard, Sainte-Croix (CH)

(73) Assignee: PRECIFLEX SA, Neuchâtel (CH)

( * ) Notice: Subject to any disclaimer, the term of this patent is extended or adjusted under 35 U.S.C. 154(b) by 525 days.

(21) Appl. No.: 17/281,641

(22) PCT Filed: Oct. 2, 2019

(86) PCT No.: PCT/IB2019/058381
§ 371 (c)(1),
(2) Date: Mar. 31, 2021

(87) PCT Pub. No.: WO2020/070663
PCT Pub. Date: Apr. 9, 2020

(65) Prior Publication Data

US 2021/0397131 A1 Dec. 23, 2021

Related U.S. Application Data

(60) Provisional application No. 62/835,038, filed on Apr. 17, 2019, provisional application No. 62/740,251, filed on Oct. 2, 2018.

(51) Int. Cl.
*G04B 1/26* (2006.01)
*G04B 19/04* (2006.01)
(Continued)

(52) U.S. Cl.
CPC ............... *G04B 1/26* (2013.01); *G04B 19/04* (2013.01); *G04B 19/207* (2013.01); *G04B 45/0076* (2013.01)

(58) Field of Classification Search
CPC .......... G04B 1/26; G04B 19/04; G04B 37/02; G04B 19/207; G04B 45/0076
See application file for complete search history.

(56) References Cited

U.S. PATENT DOCUMENTS 3,271,897 A 9/1966 Gelinas
3,650,056 A * 3/1972 Walton .................... G09F 19/10 40/409
(Continued)

FOREIGN PATENT DOCUMENTS

CH 599608 B5 7/1977
CN 2153823 Y 1/1994
(Continued)

*Primary Examiner* — Edwin A. Leon
*Assistant Examiner* — Jason M Collins
(74) *Attorney, Agent, or Firm* — DA VINCI PARTNERS LLC; John Moetteli

(57) ABSTRACT

A decorative, wearable system includes at least one decorative element mechanically and moveably suspended in a liquid by mechanical fixation elements and actuated by invisible mechanism(s). The liquid shares a substantially similar refraction index as at least one of mechanical fixation elements and/or actuation mechanisms.

15 Claims, 8 Drawing Sheets

(51) Int. Cl.
*G04B 19/20* (2006.01)
*G04B 45/00* (2006.01)

(56) References Cited

U.S. PATENT DOCUMENTS

| | | | | |
|---|---|---|---|---|
| 3,852,949 | A | 12/1974 | Sayler | |
| 4,588,618 | A | 5/1986 | Wolfe | |
| 4,939,859 | A * | 7/1990 | Bradt | A63H 23/08 40/406 |
| 5,272,681 | A * | 12/1993 | Lee | G04B 45/0061 368/76 |
| 5,652,736 | A * | 7/1997 | Lee | G04B 37/0016 368/286 |
| 6,052,338 | A | 4/2000 | Shevins | |
| 6,248,110 | B1 | 6/2001 | Reiley et al. | |
| 6,416,217 | B1 * | 7/2002 | Von Braunhut | G04B 47/044 368/278 |
| 6,697,303 | B2 | 2/2004 | Amano et al. | |
| 7,616,528 | B2 * | 11/2009 | Meadows | G04B 19/00 368/76 |
| 8,593,911 | B2 * | 11/2013 | Grize | G04B 45/00 368/65 |
| 8,986,308 | B2 | 3/2015 | Philippon et al. | |
| 8,995,237 | B2 * | 3/2015 | Vouillamoz | G04C 17/00 368/76 |
| 9,220,545 | B2 | 12/2015 | Philippon et al. | |
| 9,851,694 | B2 | 12/2017 | Fladl et al. | |
| 9,931,214 | B2 | 4/2018 | Philippon et al. | |
| 10,709,563 | B2 | 7/2020 | Philippon et al. | |
| 11,454,935 | B2 * | 9/2022 | Tortora | G04B 31/08 |
| 2004/0230193 | A1 | 11/2004 | Cheung et al. | |
| 2005/0203508 | A1 | 9/2005 | Thelen et al. | |
| 2009/0084936 | A1 | 4/2009 | Ono et al. | |
| 2009/0266305 | A1 | 10/2009 | Pavlowski | |
| 2017/0146956 | A1 | 5/2017 | Vouillamoz et al. | |
| 2018/0325680 | A1 | 11/2018 | Philippon et al. | |
| 2019/0041800 | A1 * | 2/2019 | Husson | G04B 45/0076 |
| 2019/0137935 | A1 | 5/2019 | Peters et al. | |
| 2020/0117145 | A1 * | 4/2020 | Monferrer | G04C 17/0091 |

FOREIGN PATENT DOCUMENTS

| | | | |
|---|---|---|---|
| EP | 1843226 | A1 | 10/2007 |
| EP | 1 884 841 | A1 | 2/2008 |
| EP | 2 230 574 | A1 | 9/2010 |
| EP | 3620865 | A1 | 3/2020 |
| FR | 1022253 | A | 3/1953 |
| FR | 1043243 | A | 11/1953 |
| FR | 2679052 | A1 | 11/1993 |
| GB | 2347237 | A | 8/2000 |
| JP | 2010506143 4 | | 2/2010 |
| JP | 2010506143 | A | 2/2010 |
| JP | 2009085758 | A | 10/2012 |
| WO | 9111756 | A2 | 8/1991 |
| WO | 9204662 | A1 | 3/1992 |

* cited by examiner

PORTABLE DEVICE COMPRISING DECORATIVE ELEMENTS DRIVEN BY INVISIBLE DRIVING MEANS, IN A LIQUID

CROSS REFERENCE TO RELATED APPLICATIONS

This application is the National Stage of International Application No. PCT/IB2019/058381, filed Oct. 2, 2019, which claims benefit under 35 USC § 119(a), to U.S. provisional patent application Ser. No. 62/740,251, filed Oct. 2, 2018, and to U.S. provisional patent application Ser. No. 62/835,038, filed Apr. 17, 2019.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

The invention relates to decorative objects.

Most decorative objects have a permanent shape and decoration.

What is needed is a new way to make decorative objects more alive by allowing their appearance to change.

SUMMARY OF THE INVENTION

A system and method/apparatus is provided which provides means to create an apparently living appearance for decorative objects, personal accessories, jewelry, timepieces and/or watches or the like. The system is a decorative object, which includes at least one decorative element animated in at least one liquid by at least one invisible actuation mechanism. At least one liquid shares a substantially similar refraction index as at least a part of an animation mechanism.

An object of the invention is to animate decorative objects.

Another object of the invention is to provide an indication on decorative objects, such as time-related indication.

Still another object of the invention is to provide an invisible animation mechanism in decorative objects and thus provide a magical effect.

BRIEF DESCRIPTION OF THE DRAWINGS

The attached drawings represent, by way of example, different embodiments of the subject of the invention.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as it is exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

The system 100, 200, 300, 500, 600, 800 according to this invention includes at least one decorative element 104, 224, 304, 344, 802 activated so as to move in at least one liquid 106, 206, 306, 506, 606, 830 by a displacement mechanism 110, 112, 114, 116, 316, 326, 510, 514, 516, to 610, 614, 616, 804, 806, 820, 822. The liquid 106, 206, 306, 506, 606, 830 shares a substantially similar refraction index as the displacement mechanism or part of the displacement mechanism.

Figure 1:
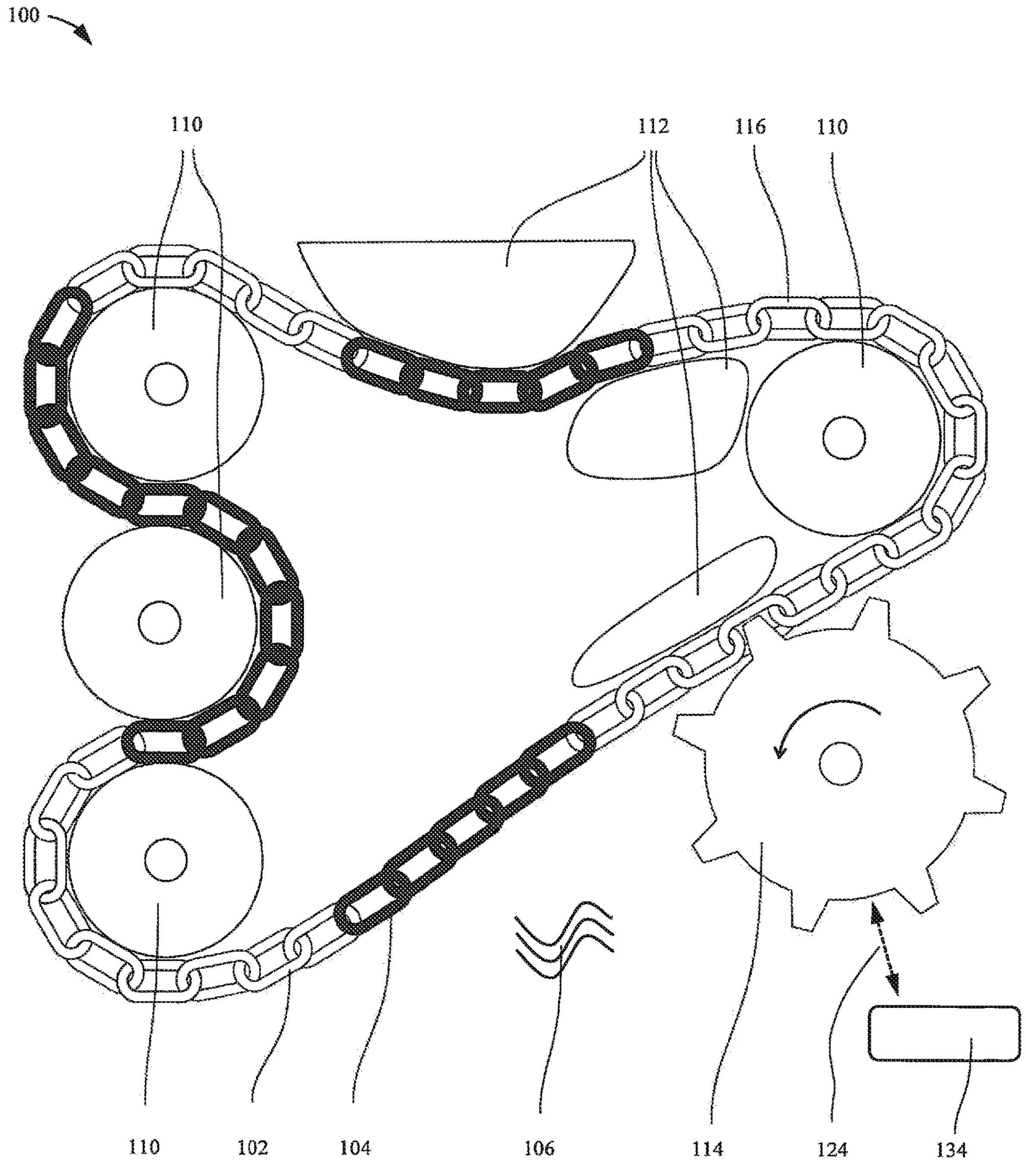
FIG. 1 is an animation mechanism according to the invention.

Referring now to FIG. 1, at least a part of the system 100 is immersed in a fluid 106, such fluid being a liquid having a refraction index substantially identical to the refraction index of selected parts 102, 110, 112, 114, 116 of the displacement mechanism that are intended to be rendered invisible or essentially invisible to an observer. The displacement mechanism may consist of a chain 116 of links 102 made of a material having a refraction index substantially identical to the refraction index of the surrounding liquid 106 so as to be essentially invisible to an observer. For a typical fluid such as glycerine or mineral oil, suitable materials for the parts 102, 110, 112, 114, 116 that are intended to be rendered invisible or essentially invisible to an observer are for example borosilicate, crystalline glass, fused silica, crown glass, flint glass, quartz, transparent ceramic (in particular Zerodur® or spinel), sapphire, polymethyl methacrylate (PMMA), polycarbonate, polyurethane. The chain 116 may include visible links 104 made of a material of refraction index significantly different from the refraction index of the surrounding liquid 106, such visible links may be made of precious metals or any other appropriate materials. Decorative elements 344, 802 may also be mounted on the invisible links 102 or on the visible links 104. The chain 116 of invisible links 102 and visible links 104 is mobilized via at least one gear wheel 114, and driven through a circuit defined by pulleys 110 and, optionally, guides 112. The pulleys 110, the guides 112 and/or the gear wheel 114 may be made of a material having a refraction index substantially identical to the refraction index of the surrounding liquid 106 so as to be at least substantially invisible to the user/wearer. The actuation mechanism (shown in schematic form as reference numeral 134) activates the at least one gear wheel 114 via a liquid- or watertight transmission (shown in schematic form as reference numeral 124). Such liquid- or watertight transmission 124 may be a magnetic transmission, a direct transmission with rubber seals, a substantially linear transmission encapsulated in a bellows, a hydraulic transmission or any appropriate transmission as known in the industry. The actuation mechanism 134 may be a direct action from the user, or a mechanism storing energy (mechanically, electrically, chemically, hydraulically, etc) and delivering movement at random so as to create a surprising effect, or upon triggering by the user, or a time-keeping mechanism providing a regular animation, optionally activated at specific points in time, like the top of the hour. In such case, an indication of time-related information may be provided. In case the system is implemented in a wearable item, the source of energy for the animation may be provided by a combination of a movement of the wearer and the effect of gravity on a pendulum or an oscillating mass rewinding the actuation mechanism 134.

Figure 2:
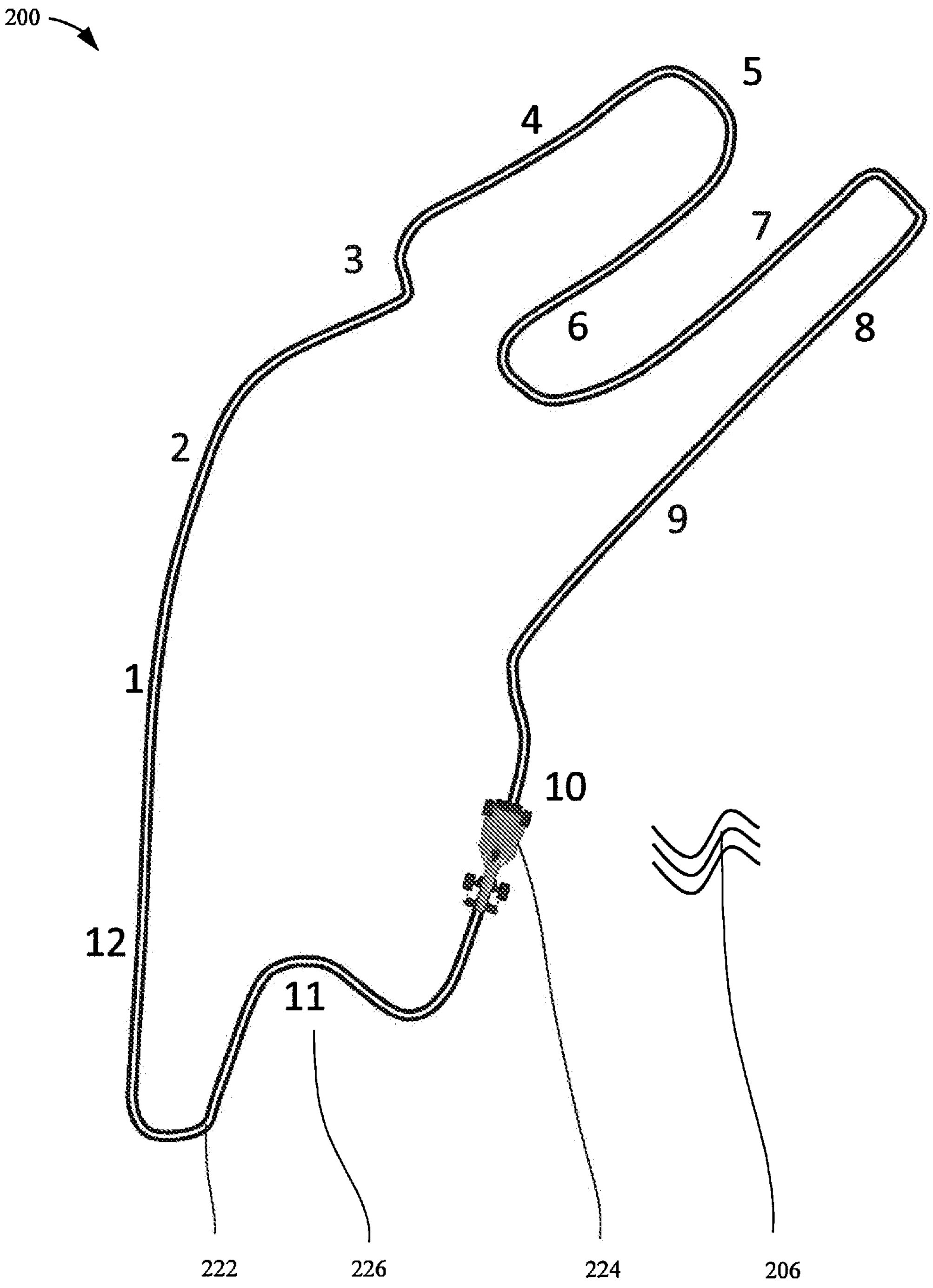
FIG. 2 shows an indicator according to the invention.
Figure 3A:
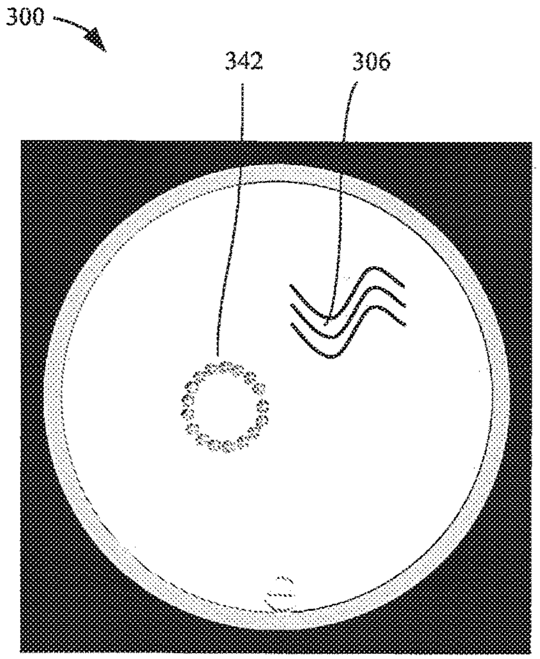
FIGS. 3A-3D shows the progression of an animation according to the invention
Figure 3B:
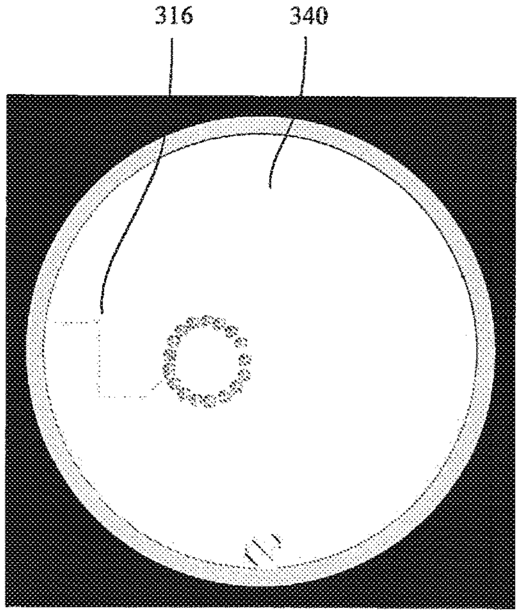
Figure 3C:
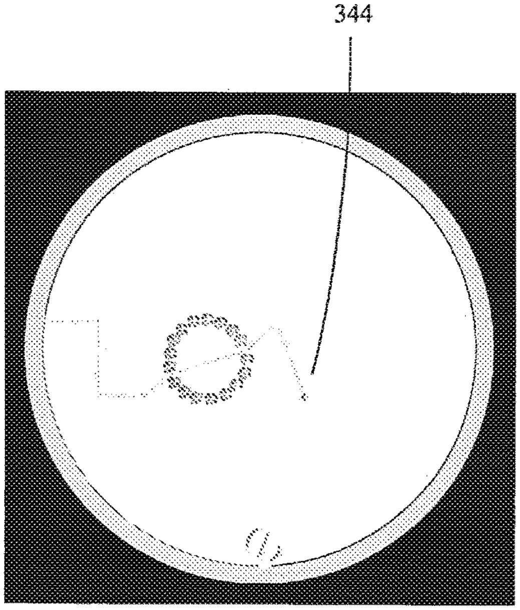
Figure 3D:
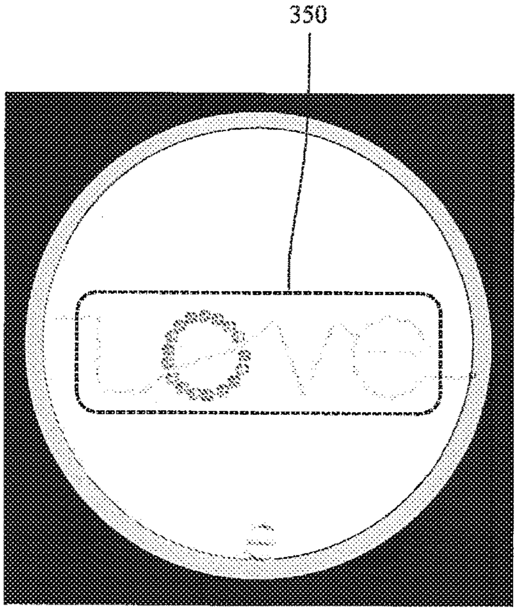
Figure 4:
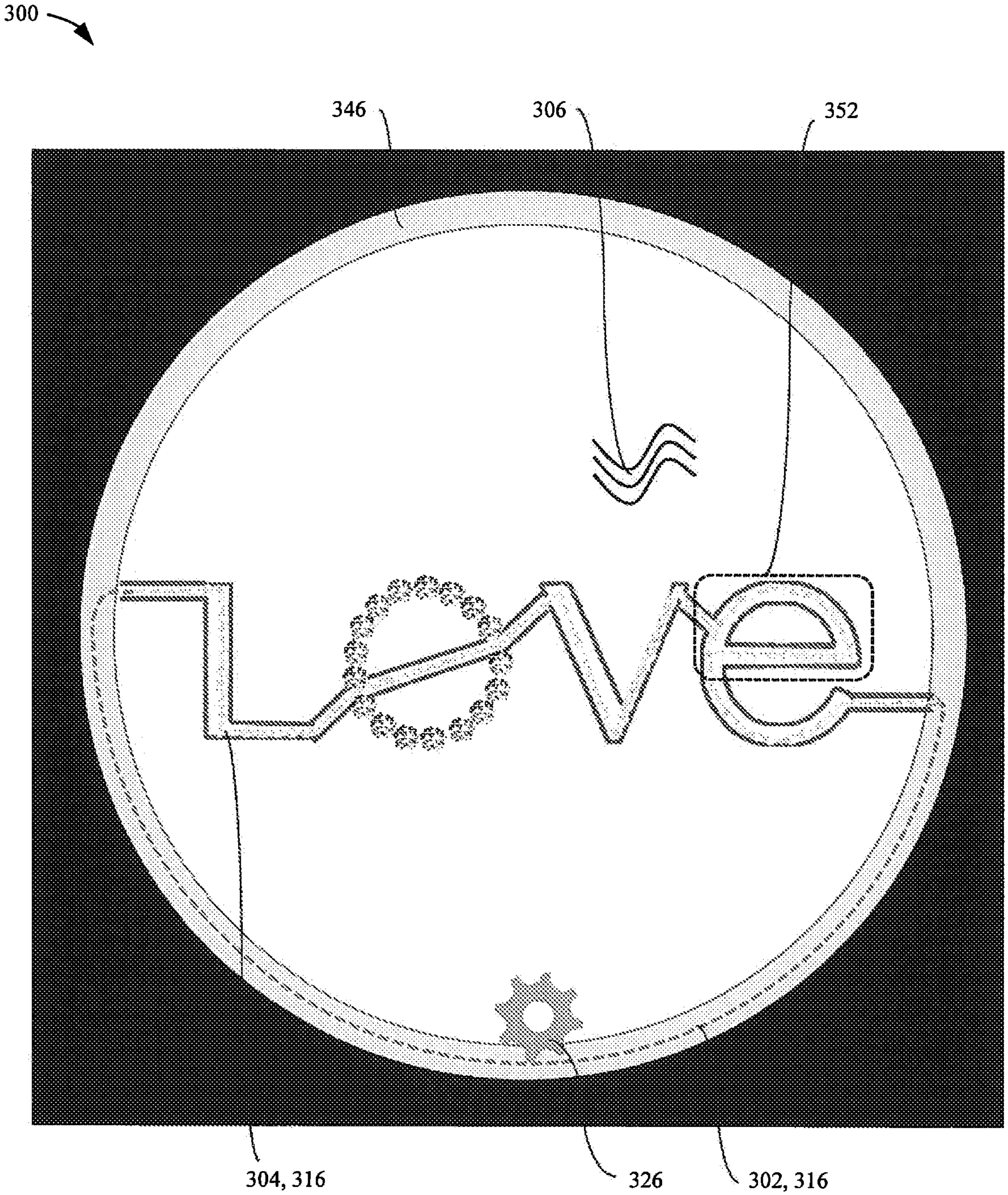
FIG. 4 shows an animation mechanism according to the invention

Referring now to FIG. 2, the path 222 defined for the chain 116, 316, 516, 616, 806 by pulleys 110, 510, 610 and guides 112 may have a well-known shape 222 such as that of an automobile race circuit (e.g. the Bugatti circuit in Le Mans), and the chain may carry one or more decorative element 224 (e.g. a miniature race car), and drive it along indicia 226 so as to represent the passing of time. The pulleys 110, 510, 610, guides 112, chain links 102, 502, 602, and gear wheel 114, 514, 614 may be made of a material having a refraction index substantially identical to the refraction index of the surrounding liquid 206 so as to be invisible to the user/wearer.

Referring now to FIGS. 3A to 3C and FIG. 4, the system 300 allows the representation 350 of a word “LOVE”, using a chain 316 of invisible links 302 and visible links 304, in combination with fixed decoration elements 342 on the display 340. In this example, the visible links 304 form a continuous chain 316, and differences of height allow crossing of the chain 316 in order to form closed shapes 352. On one or more of the links 302, 304, a decorative element 344 such as a stone may be mounted. The return path of the chain 316 may be placed under a cover 346 so as to be outside of the field of view of the user/wearer, so that when the animation movement continues, the word “LOVE” disappears progressively. In the same way, displaying words like “NIGHT” and “DAY” at the appropriate moments, or any other words or shapes may provide an interesting animation combined with an indication of time.

Figure 5:
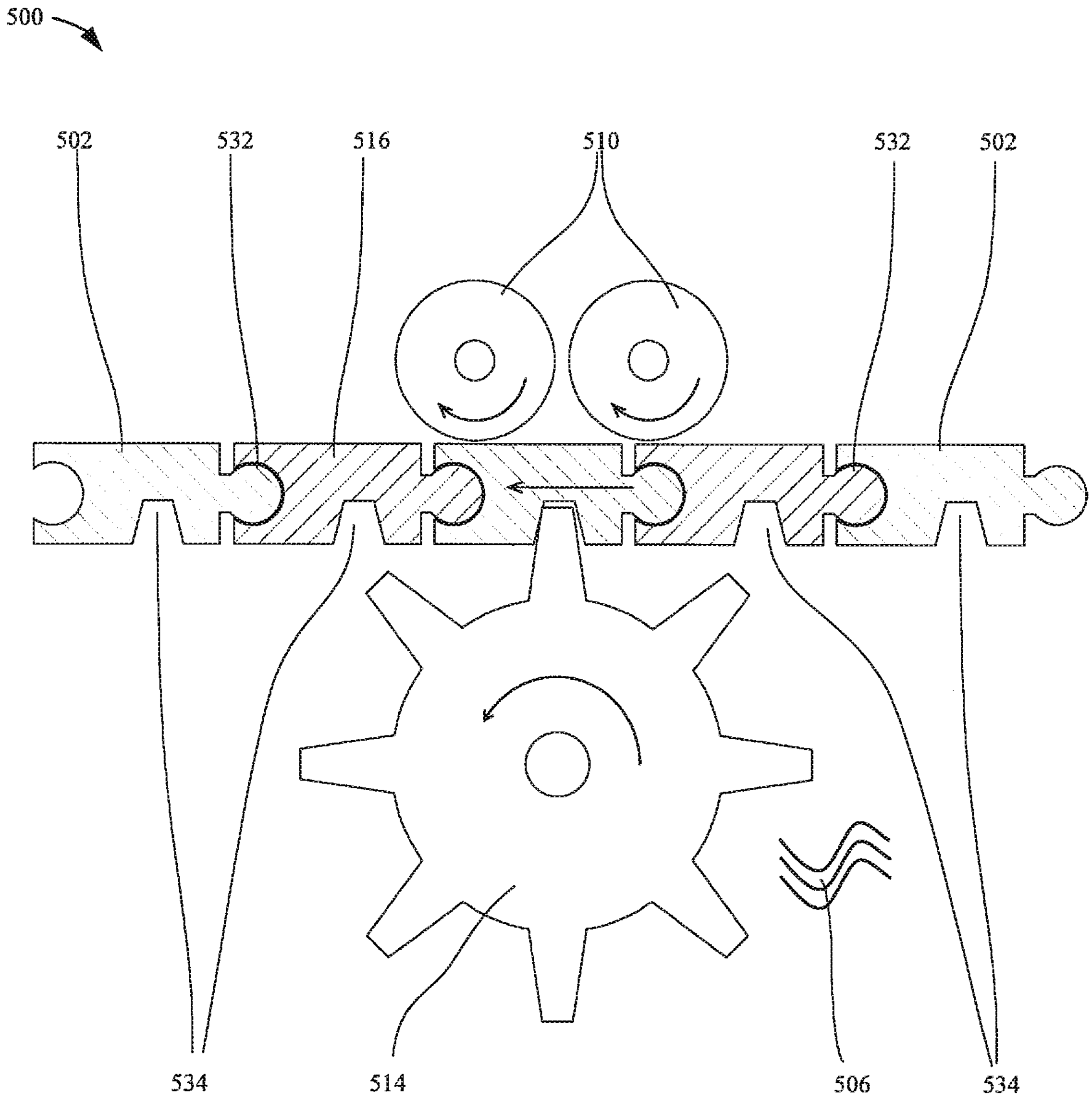
FIG. 5 is a cross section view of a chain and animation mechanism of the invention

Referring now to FIG. 5, the chain links 502 are attached to each other with kneecap joints 532, and contain appropriate rack shapes 534 so as to be mobilized via a gear wheel 514 and guided by pulleys 510 or other shaped guides. Each chain link 502 may carry one or more decorative elements 344, 802. The geometry of the chain links 502 may be appropriately designed so as to limit the bowing or buckling of the chain 516 when being pushed by the one or more gear wheel 514, allowing the bidirectional mobilization of the animation. The kneecap joints 532, the rack shapes 534 and the gear wheel 514 may be treated for gliding properties such as with a “TEFLON”® coating. The pulleys 510, guides, chain links 502 and gear wheel 514 may be made of a material having a refraction index substantially identical to the refraction index of the surrounding liquid 506 so as to be invisible to the user/wearer.

Figure 6:
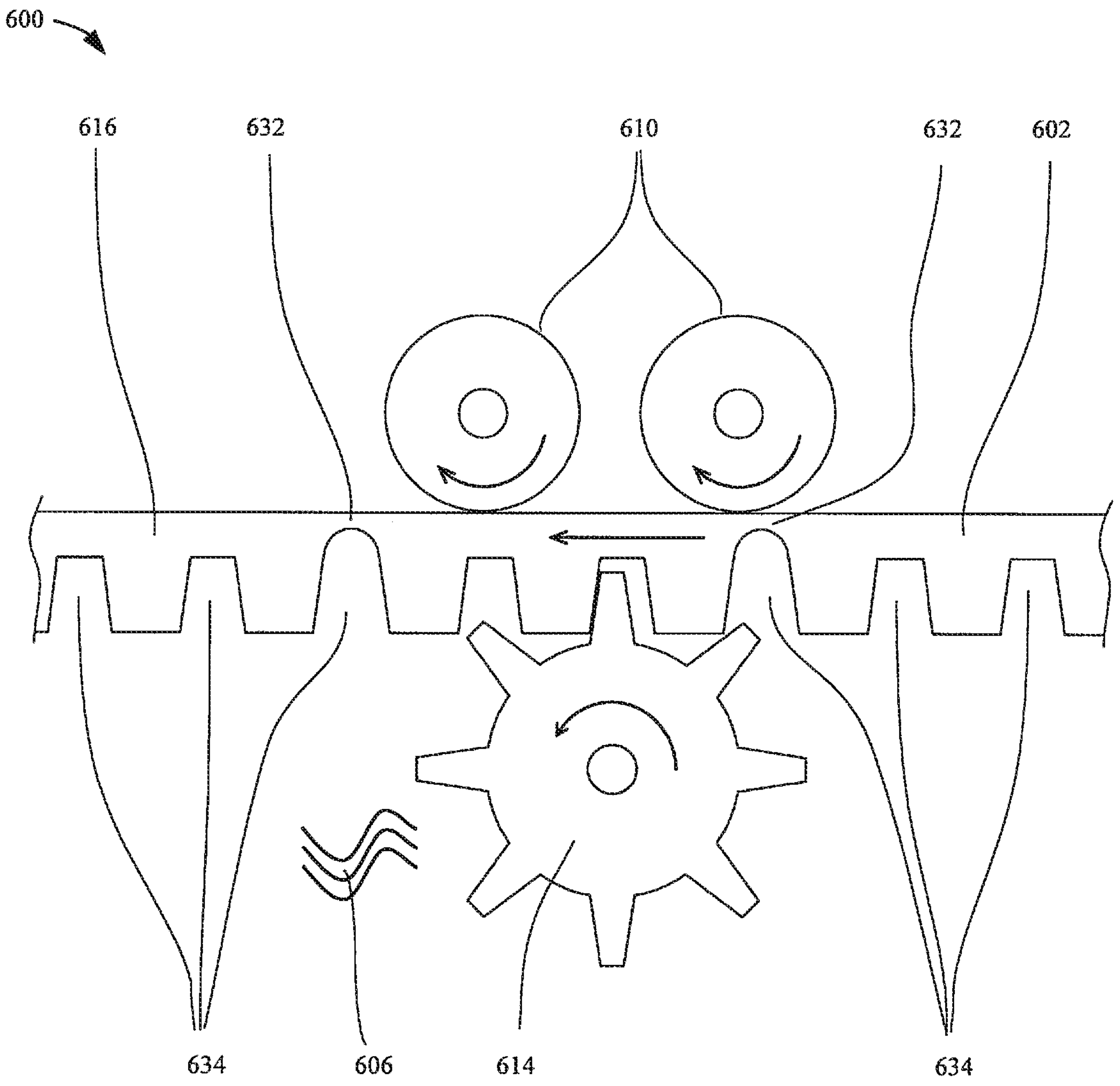
FIG. 6 is a view of another chain and animation mechanism of the invention

Referring now to FIG. 6, the chain 616 is cut out of bulk material such as glass, the chain links may consist of more rigid areas 602 separated by thinner and more flexible areas 632, so that the chain 616 has a sufficient flexibility to follow an animation path 222. Visible decoration elements 344, 802 may be mounted on any of the rigid areas 602. Mobilization of the chain 616 may be made with a rack 634 formed or cut in the chain 616, while the chain passes between one or more pulleys 610 and at least one gearwheel 614.

In the above, the description of a chain 116, 316, 516, 616 is given as example. Other embodiments of the same function may be made with fibers, in particular polymer or glass fibers, in particular optical fibers may be found with a refraction index corresponding to substantially transparent liquids. Chain links connected to one another with magnets may also be used.

Figure 7A:
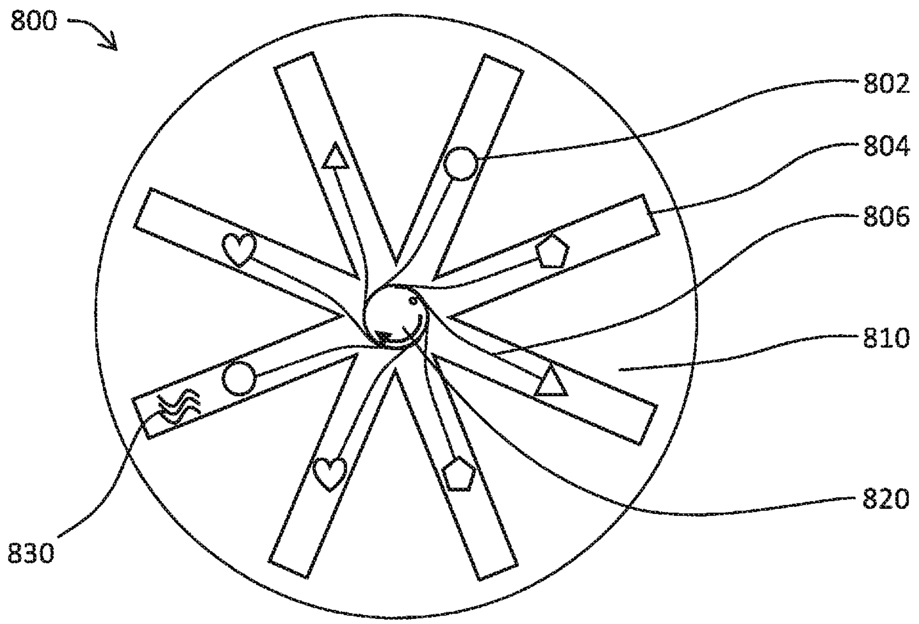
FIG. 7A is a top view of a still one more animation mechanism of the invention.
Figure 7B:
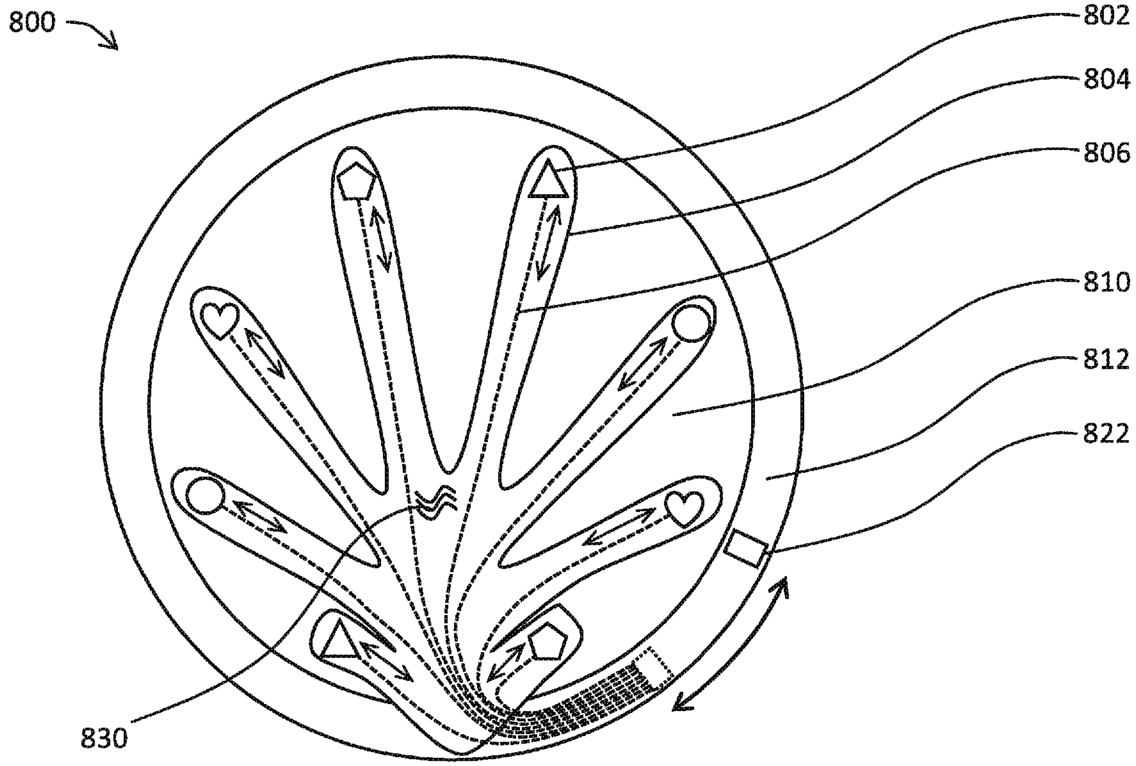
FIG. 7B is a top view of a further alternate animation mechanism of the invention.

Referring now to FIGS. 7A and 7B, the mobile decorative elements 802 are guided by channels 804 and moved by a displacement transmitting element 806 which transmits a movement generated by the user via a pulley 820, a slider 822, or any other appropriate mechanism (not represented here). Instead of being generated by the user, the movement may also be generated by a clock system (not represented here), such clock system being electronically or mechanically powered. The guiding of the decorative elements 802 in the channels 804 may allow some degree of freedom in several directions to give the decorative elements a more lively behavior when the system 800 is moved relative to gravity, or when the system 800 is accelerated in any direction by its wearer. Parts 804, 806, 820 of the displacement mechanism that are in the visible area of the accessory 810 may be made in a material with a refraction index close to the refraction index of the surrounding fluid 830 to be substantially invisible. For example, the displacement transmitting elements 806 may be advantageously made of glass fibers but any chain such as described above may also be used. The surrounding fluid 830 may be at least one liquid. The surrounding fluid may be transparent or colored. Components, elements, or portions of the displacement mechanism (not represented here) that are in non-visible areas of the system 800 may be made in any material appropriate for their function.

Some mobile decorative elements 344, 802 may be hidden in non-visible areas 346 of the system 100, 200, 300, 500, 600, 800, and appear when the animation is triggered.

Some mobile elements 344, 802 may hide each other in certain positions within the system 100, 200, 300, 500, 600, 800, and the hidden mobile element 344, 802 would then suddenly appear as an image when the animation is triggered.

Some decoration elements 344, 802 may change color when they are on top of each other, for example a semi-transparent yellow part on top of a semi-transparent blue part would appear green.

In an advantage, the system 100, 300, 500, 600, 800 animates decorative objects, personal accessories, jewelry, timepieces and/or watches.

In another advantage, the invention 200, 300, 800 provides an indication on decorative objects, such as time-related indications.

In still another advantage, the invention 100, 200, 300, 500, 600, 800 provides an invisible displacement mechanism 110, 112, 114, 116, 316, 326, 510, 514, 516, 610, 614, 616, 804, 806, 820, 822 in decorative objects and thus provides a magical effect.

In a further advantage, the system 100, 200, 300, 500, 600, 800 creates an apparently living decoration for personal accessories.

In another advantage, the invention changes its appearance when moved.

The invention can be summarized by the following feature sets.

1. A system (100, 200, 300, 500, 600, 800) comprising at least one decorative element (104, 224, 304, 344, 802) mechanically and moveably attached in a liquid (106, 206, 306, 506, 606, 830) on a displacement mechanism (110, 112, 114, 116, 316, 326, 510, 514, 516, 610, 614, 616, 804, 806, 820, 822), the liquid sharing a substantially similar refraction index as at least a portion of the displacement mechanism so that at least a portion of the displacement mechanism is substantially invisible to an observer.
2. The system of feature set 1, wherein the displacement mechanism is made of an articulated chain (116, 316, 516) of rigid elements (102, 104, 302, 304, 502) actuated by a transmission (114, 124, 326, 514), wherein at least one of the rigid elements is made of a material having a refraction index substantially identical to the refraction index of the surrounding liquid (106, 206, 306, 506) so as to be essentially invisible to an observer.
3. The system of feature set 1, wherein the displacement mechanism is made of a semi-flexible element (616) actuated by a transmission (614), wherein at least a part of the semi-flexible element is made of a material having a refraction index substantially identical to the refraction index of the surrounding liquid (606) so as to be essentially invisible to an observer.
4. The system of feature set 1, wherein the displacement mechanism is made of a flexible element (806) actuated by a transmission (820, 822), wherein the flexible element is made of a material having a refraction index substantially identical to the refraction index of the surrounding liquid so as to be essentially invisible to an observer.
5. The system of feature sets 1, 2, 3 or 4, wherein visible portions of the displacement mechanism follow a predefined path and participate to the generation of a changing image.
6. The system of feature sets 1, 2, 3, 4, or 5, wherein a transmission (114, 124, 326, 514, 614, 820, 822) connected to the displacement mechanism (110, 112, 114, 116, 316, 326, 510, 514, 516, 610, 614, 616, 804, 806, 820, 822) is actuated by the user.
7. The system of feature sets 1, 2, 3, 4 or 5, wherein a transmission (114, 124, 326, 514, 614, 820, 822) connected to the displacement mechanism (110, 112, 114, 116, 316, 326, 510, 514, 516, 610, 614, 616, 804, 806, 820, 822) is actuated by an automatic actuation mechanism (134).
8. The system of feature sets 6 or 7, wherein the movement of the at least one decorative element (104, 224, 304, 344, 802) generates an animation.
9. The system of feature sets 7, wherein the movement of the at least one decorative element (104, 224, 304, 344, 802) indicates a value.
10. The system of feature set 7, wherein the automatic actuation mechanism (134) is a timepiece.
11. The system of feature set 10, wherein the movement of the at least one decorative element (104, 224, 304, 344, 802) indicates time.
12. The system of feature set 11, wherein the movement of the at least one decorative element (104, 224, 304, 344, 802) along adjacent indices (226) indicates time.
13. The system of feature sets 2, 3, 4, 5 or 8, wherein the transmission (114, 124, 326, 514, 614, 820, 822) is actuated by a mass reacting to the changes of orientation of the system relative to gravity.
14. The system of feature set 13, wherein the movement of the at least one decorative element (104, 224, 304, 344, 802) generates an animation.
15. A method for animating a decorative element (104, 224, 304, 344, 802), such as decorative objects, personal accessories, jewelry, timepieces and/or watches using the system of any of the preceeding feature sets, the method comprising at least the steps of:
   a. attaching the system to the user's clothing or around an appendage of the user's body;
   b. moving the portion of the body to which the system is attached; and
   c, observing the animation effect.
16. The system of feature set 1, further including a thermal compensation system, the system comprising a mechanism accommodating thermal expansion and/or contraction of the liquid, avoiding the generation of unacceptably high pressure which could result in liquid leaking out of the system in case of temperature rise, or the generation of unattractive gas bubbles in the liquid in case of low temperature.
17. The system(s) and/or method(s) as described in the instant specification, dependent feature sets, abstract (herein incorporated by reference), and/or drawing figures.

Other characteristics and modes of execution of the invention are described in the appended claims.

It should be appreciated that the particular implementations shown and herein described are representative of the invention and its best mode and are not intended to limit the scope of the present invention in any way.

As will be appreciated by skilled artisans, the present invention may be embodied as a system, a device, or a method.

Moreover, the system contemplates the use, sale and/or distribution of any goods, services or information having similar functionality described herein.

The specification and figures should be considered in an illustrative manner, rather than a restrictive manner, and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereat are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Materials used for the realization of the present invention are chosen to be suitable and in compliance to the operating temperature range of the invention. Such materials are e.g. metals, polymers or glass, and in particular sapphire glass. Equally for structures used for the realization of the present invention, such structures, as e.g. bellows, chips, or intrinsic membranes, are configured to be suitable and in compliance to the operating temperature range of the invention.

The system may include a thermal compensation system, the system comprising a mechanism accommodating thermal expansion and/or contraction of the liquid, avoiding the generation of unacceptably high pressure which could result in liquid leaking out of the system in case of temperature rise, or the generation of unattractive gas bubbles in the liquid in case of low temperature. Such thermal compensation may be made partially or completely invisible to the user. Such systems are disclosed in PCT Application No. PCT/IB2015/000448 of the same applicant, entitled SYSTEMS AND METHODS FOR ABSORPTION/EXPANSION/CONTRACTION/MOVEMENT OF A LIQUID IN A TRANSPARENT CAVITY, filed on the 7 Apr. 2015, the contents of which are incorporated herein by reference thereto and relied upon.

Furthermore, the present invention may accommodate and employ a miniature, user-powered portable device (not shown) for triggering the operation of an electric power consuming element (such as shown in schematic form as reference numeral 134, 326), which is preferably wearable, employs mechanical energy storage and incorporates miniature special effect elements 104, 224, 342, 344, 802 which are activated on-demand for a limited duration for back-lighting, illumination, or other special effect purposes without the need for a battery or other electro-chemical storage device. The device comprises a manual spring loading mechanism, a spiral spring, a manual trigger mechanism, a transmission for increasing the rotational speed, a miniature generator, and at least one electric power consuming element such as a transmitter or a light source, preferably a light emitting diode. Such a device is disclosed in PCT Application No, PCT/IB2016/000249 of the same applicant, entitled MINIATURE USER-POWERED LIGHTING DEVICE, SYSTEM AND METHOD OF USING SAME, filed on the 7 Mar. 2016, the contents of which are incorporated herein by reference thereto and relied upon. Such device may also be used to generate electricity to power the actuation mechanism 134, 326.

Further, the invention should be considered as comprising all possible combinations of every feature described in the instant specification, appended claims, and/or drawing figures that may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-á-vis the public or third parties, no express or implied license is granted to prepare derivative works based on this patent specification, inclusive of the appendix hereto and any computer program comprised therein.

Additional features and functionality of the invention are described in the claims appended hereto and/or in the abstract. Such claims and/or abstract are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims that ultimately issue in this application.

What is claimed is:

1. A portable/wearable device in which at least one decorative element is disposed in a contained liquid, the element mechanically and moveably attached to a displacement mechanism, wherein the displacement mechanism comprises an articulated chain of rigid elements actuated by a transmission, wherein at least one of the rigid elements is made of a material which has a substantially identical refraction index as at least a portion of the displacement mechanism so that at least a portion of the displacement mechanism is substantially invisible to an observer, the device further including a thermal compensation system. the system comprising a mechanism accommodating thermal expansion and/or contraction of the liquid, avoiding the generation of unacceptably high pressure which could result in liquid leaking out of the device in case of temperature rise or the generation of unattractive gas bubbles in the liquid in case of low temperature.

2. The device of claim 1, wherein the transmission is actuated by a mass reacting to the changes of orientation of the device relative to gravity.

3. The device of claim 2, wherein the movement of the at least one decorative element generates an animation.

4. The device of claim 1, wherein the displacement mechanism comprises semi-flexible portions made of rigid areas and flexible areas actuated by a transmission, wherein at least a part of the displacement mechanism is made of a material having a refraction index substantially identical to the refraction index of the surrounding liquid so as to be essentially invisible to an observer.

5. The device of claim 1, wherein the displacement mechanism comprises an element actuated by a transmission, wherein the element is made of a material having a refraction index substantially identical to the refraction index of the surrounding liquid so as to be essentially invisible to an observer.

6. The device of claim 1, wherein visible portions of the displacement mechanism follow a predefined path and participate to the generation of a changing image.

7. The device of claim 1, wherein a transmission connected to the displacement mechanism is actuated by the user.

8. The device of claim 7, wherein the movement of the at least one decorative element generates an animation.

9. The device of claim 1, wherein a transmission connected to the displacement mechanism is actuated by an automatic actuation mechanism.

10. The device of claim 9, wherein the movement of the at least one decorative element indicates a value.

11. The device of claim 9, wherein the automatic actuation mechanism is a timepiece.

12. The device of claim 11, wherein the movement of the at least one decorative element indicates time.

13. The device of claim 12, wherein the movement of the at least one decorative element along adjacent indices indicates time.

14. A method for animating a decorative element, using the device of claim 1, the method comprising at least the steps of:

a. attaching the device to the user's clothing or around an appendage of the user's body;

b. moving the portion of the body to which the device is attached; and c. observing the animation effect.

15. The device of claim 1, wherein the displacement mechanism is activated by an actuation mechanism located outside the contained liquid via a liquid-tight transmission.

* * * * *